United States Patent
Guthrie et al.

(10) Patent No.: US 8,520,024 B2
(45) Date of Patent: Aug. 27, 2013

(54) VIRTUAL INTERACTIVE PRESENCE SYSTEMS AND METHODS

(75) Inventors: Barton Guthrie, Birmingham, AL (US); Phillip C. Shum, Birmingham, AL (US); Marcus W. Dillavou, Birmingham, AL (US); Douglas Ross, Birmingham, AL (US); Alan M. Shih, Birmingham, AL (US)

(73) Assignee: UAB Research Foundation, Birmingham, AL (US)

( * ) Notice: Subject to any disclaimer, the term of this patent is extended or adjusted under 35 U.S.C. 154(b) by 641 days.

(21) Appl. No.: 12/600,805

(22) PCT Filed: May 19, 2008

(86) PCT No.: PCT/US2008/064118
§ 371 (c)(1),
(2), (4) Date: Aug. 11, 2010

(87) PCT Pub. No.: WO2009/005901
PCT Pub. Date: Jan. 8, 2009

(65) Prior Publication Data
US 2010/0295921 A1    Nov. 25, 2010

Related U.S. Application Data

(60) Provisional application No. 60/930,874, filed on May 18, 2007.

(51) Int. Cl.
*G09G 5/00* (2006.01)
*G06F 15/16* (2006.01)
*G06F 3/048* (2013.01)

(52) U.S. Cl.
USPC ............................. 345/619; 709/203; 715/757

(58) Field of Classification Search
USPC ........................................... 345/619; 715/757
See application file for complete search history.

(56) References Cited

U.S. PATENT DOCUMENTS

| | | | |
|---|---|---|---|
| 3,931,679 A | 1/1976 | Carter | |
| 4,601,664 A | 7/1986 | Bertino, III et al. | |
| 4,737,921 A * | 4/1988 | Goldwasser et al. | 345/421 |
| 4,970,666 A | 11/1990 | Welsh | 364/522 |
| 5,102,340 A | 4/1992 | Berlinghoff et al. | |
| 5,391,081 A | 2/1995 | Lamptoang et al. | |
| 5,403,192 A | 4/1995 | Kleinwaks et al. | |
| 5,526,812 A * | 6/1996 | Dumoulin et al. | 600/407 |

(Continued)

FOREIGN PATENT DOCUMENTS

| | | |
|---|---|---|
| AU | 2008270883 | 5/2008 |
| CA | 2694095 | 5/2008 |

(Continued)

OTHER PUBLICATIONS

Billinghurst et al., "Mixing realities in Shared Spaces: An augmented reality interface for collaborative computing," Multimedia and Expo, 2000. ICME 2000 IEEE International Conference CE on New York, Jul. 30, 2000-Aug. 2, 2000, vol. 3. 1641-1644. Jul. 30, 2000.

(Continued)

*Primary Examiner* — Mohammad Islam
(74) *Attorney, Agent, or Firm* — Ballard Spahr LLP

(57) ABSTRACT

Provided herein are methods and systems for virtual interactive presence.

30 Claims, 14 Drawing Sheets

(56) References Cited

U.S. PATENT DOCUMENTS

| | | | |
|---|---|---|---|
| 5,584,701 A | 12/1996 | Lampotang | |
| 5,769,641 A | 6/1998 | Lampotang et al. | |
| 5,772,442 A | 6/1998 | Lampotang et al. | |
| 5,779,484 A | 7/1998 | Lampotang et al. | |
| 5,853,292 A | 12/1998 | Eggert et al. | |
| 5,868,579 A | 2/1999 | Lampotang et al. | |
| 5,882,207 A | 3/1999 | Lampotang et al. | |
| 5,890,908 A | 4/1999 | Lampotang et al. | |
| 5,900,923 A | 5/1999 | Prendergast et al. | |
| 5,941,710 A | 8/1999 | Lampotang et al. | |
| 6,061,469 A * | 5/2000 | Walterman | 382/154 |
| 6,166,744 A | 12/2000 | Jaszlies | 345/435 |
| 6,193,519 B1 | 2/2001 | Eggert et al. | |
| 6,220,866 B1 | 4/2001 | Amend et al. | |
| 6,241,609 B1 | 6/2001 | Rutgers | 463/31 |
| 6,246,975 B1 | 6/2001 | Rivonelli et al. | |
| 6,257,234 B1 | 7/2001 | Sun | |
| 6,273,728 B1 | 8/2001 | van Meurs et al. | |
| 6,301,339 B1 | 10/2001 | Staples | 379/93.01 |
| 6,443,735 B1 | 9/2002 | Eggert et al. | |
| 6,461,165 B1 | 10/2002 | Takushina et al. | |
| 6,503,087 B1 | 1/2003 | Eggert et al. | |
| 6,527,558 B1 | 3/2003 | Eggert | 434/327 |
| 6,535,714 B2 | 3/2003 | Melker et al. | |
| 6,608,628 B1 | 8/2003 | Ross et al. | |
| 6,692,258 B1 | 2/2004 | Kurzweil et al. | |
| 6,697,451 B2 | 2/2004 | Acharya et al. | |
| 6,747,672 B1 | 6/2004 | Haakonsen et al. | |
| 6,758,676 B2 | 7/2004 | Eggert et al. | |
| 6,774,885 B1 | 8/2004 | Even-Zohar | 345/156 |
| 6,780,016 B1 | 8/2004 | Toly | |
| 6,921,267 B2 | 7/2005 | Van Oostrom et al. | |
| 7,015,954 B1 | 3/2006 | Foote | 348/218.1 |
| 7,259,761 B2 | 8/2007 | Shih | 345/419 |
| 7,367,809 B2 | 5/2008 | Takahashi | 434/262 |
| 7,373,377 B2 | 5/2008 | Altieri | 709/203 |
| 7,376,903 B2 | 5/2008 | Morita | 715/757 |
| 7,728,868 B2 | 6/2010 | Razzaque | 348/77 |
| 7,787,927 B2 | 8/2010 | Wood | 600/410 |
| 7,949,616 B2 | 5/2011 | Levy | 705/34 |
| 8,046,408 B2 | 10/2011 | Torabi | 709/203 |
| 8,243,123 B1 * | 8/2012 | Geshwind et al. | 348/42 |
| 2004/0009459 A1 | 1/2004 | Anderson et al. | |
| 2004/0193441 A1* | 9/2004 | Altieri | 705/1 |
| 2004/0260170 A1 | 12/2004 | Wood et al. | |
| 2005/0267778 A1* | 12/2005 | Kazman | 705/1 |
| 2005/0289472 A1* | 12/2005 | Morita et al. | 715/757 |
| 2006/0257016 A1* | 11/2006 | Shioi et al. | 382/154 |
| 2007/0055131 A1* | 3/2007 | Deinzer et al. | 600/407 |
| 2008/0055305 A1* | 3/2008 | Blank et al. | 345/419 |

FOREIGN PATENT DOCUMENTS

| | | |
|---|---|---|
| CN | 101743567 | 6/2010 |
| EP | 1804209 | 7/2007 |
| EP | 8826034.4 | 5/2008 |
| EP | 2163092 | 3/2010 |
| HK | 1144608 | 2/2011 |
| IN | 7420/CHENP/2009 | 5/2008 |
| JP | 2010-528354 | 8/2010 |
| NZ | 582133 | 5/2008 |
| WO | WO 96/09722 | 3/1996 |
| WO | WO 00/49475 | 8/2000 |
| WO | WO 2005/119554 | 12/2005 |
| WO | WO 2006/108279 | 10/2006 |
| WO | WO 2007/059477 | 5/2007 |
| WO | WO 2009/005901 | 1/2009 |
| WO | PCT/US2012/050238 | 8/2012 |

OTHER PUBLICATIONS

Dangelmaier et al., "Virtual and augmented reality support for discrete manufacturing system simulation," Computers in Industry, vol. 56, No. 4, May 1, 2005.

European Search Report for European Application No. 08826034.4 filed on May 19, 2008.

Theoktisto et al., "Enhancing collaboration in virtual reality applications," Computers and Graphics, vol. 29, No. 5, Oct. 1, 2005.

U.S. Appl. No. 13/476,712, filed May 21, 2012, Dillavou.

U.S. Appl. No. 13/727,202, filed Dec. 26, 2012, Dillavou.

Ai, et al. "Tele-immersive medical educational environment," University of Illinois at Chicago. VRMedLab, School of Biomedical and Health Information Sciences: p. 1-7.

Ballantyne, et al. "The da vinci telerobotic surgical systems: the virtual operative field and telepresence surgery" Surg Clin North Am. 2003, 83 (6): p. 1293-1304.

Billinghurst, et al. "Real world teleconferencing," IEEE Computer Graphics 2002, 22(6): p. 11-13.

Birkfellner, et al. "Computer-enhanced stereoscopic vision in a head-mounted operating binocular," Phys Med Biol 2003, 48 (3): p. N49-57.

Gibson, et al. "Simulating arthroscopic knee surgery using volumetric object representations, real-time volume rendering and haptic feedback," Proceedings of CVRMed-MRCAS 1997: p. 369-378.

Haluck, et al. Reliability and validity of endotower, a virtual reality trainer for angled endoscope navigation. J.D. Westwood et al. (Eds), Meidcine Meets Virtual Reality 2002, IOS Press: p. 1-6.

Nicolau, et al. "An augmented reality system to guide radio-frequency tumour ablation," Computer Animation and Virtual World (previously the Journal of Visualization & Computer Animation) 2004, 16 (1): p. 1-10, 200.

Nishikawa, et al. Mutual view sharing system for real-time telecommunication, Systems and Computers in Japan 2006, 37 (14): p. 292-304.

Paul, et al. "Augmented virtuality based on stereoscopic reconstruction in multimodal image-guided neurosurgery: methods and performance evaluation," IEEE Trans Med Imaging 2005, 24 (11): p. 1500-1511.

Satava, R.M. "Medical applications of virtual reality," J Med Systems 1995, 19: p. 275-280.

Shuhaiber, J.H. "Augmented reality in surgery," Arch Surg. 2004, 139 (2): p. 170-174.

Soler, et al. "Virtual reality, augmented reality and robotics in surgical procedures of the liver," Th. M. Buzug and T.C. Lueth, editors. Perspectives in Image-guided Surgery 2004: p. 476-484.

Taffinder, et al. "Validation of virtual reality to teach and assess pscyhomotor skills in laparascopic surgery: results from randomized controlled studies using the MIST VR laparoscopic simulator," Medicine Meets Virtual Reality 1998: p. 124-133.

Viciana-Abad, et al. "A preliminary study of presence in virtual reality training simulation for medical emergencies," Medicinal Meets Virtual Reality 2004, 12: p. 394-396.

Vogt, et al. "An ar system with intuitive user interface for manipulation and visualization of 3d medical data," Stud Health Technol Inform. 2004, 98: p. 397-403.

Wann, et al. "Natural problems for stereoscopic depth perception in virtual environments," Vision Research 1995, 35 (19): p. 2731-2736.

Examiner's First Report issued Mar. 29, 2012 by IP Australia for Application No. 2008270883, filed May 19, 2008 (Applicant—UAB Research Foundation; Inventor—Guthrie, et al.;) (p. 1-2).

Request for Examination and Request to Postpone filed Mar. 3, 2011 to IP Australia for Application No. 2008270883 filed May 19, 2008 (Applicant—UAB Research Foundation; Inventor—Guthrie, et al.;) (p. 1-18).

Request for Examination of Patent issued Sep. 14, 2010 by IP Australia for Application No. 2008270883, filed May 19, 2008 (Applicant—UAB Research Foundation; Inventor—Guthrie, et al.;) (p. 1-1).

Response to Postponing Request issued Mar. 7, 2011 by IP Australia for Application No. 2008270883, filed May 19, 2008 (Applicant—UAB Research Foundation; Inventor—Guthrie, et al.;) (p. 1-1).

First Office Action issued Jun. 23, 2011 by the State Intellectual Property Office of the People's Republic of China for Application No. 2008800243237, filed May 19, 2080 (Applicant—UAB Research Foundation; Inventor—Guthrie, et al.;) (p. 1-68).

Notification of Passing Preliminary Examination issued Apr. 17, 2010 by the State Intellectual Property Office of the People's Republic of China for Application No. 2008800243237 filed May 19, 2008 (Applicant—UAB Research Foundation; Inventor—Guthrie, et al.;) (p. 1-2).

Response to First Office Action filed Nov. 1, 2011 for Application No. 2008800243237, filed May 19, 2008 (Applicant—UAB Research Foundation; Inventor—Guthrie, et al.;) (p. 1-5).

Response to Second Office Action filed Aug. 15, 2012 for Application No. 2008800243237, filed May 19, 2008 (Applicant—UAB Research Foundation; Inventor—Guthrie, et al.;) (p. 1-5).

Second Office Action issued May 3, 2012 by the State Intellectual Property Office of the People's Republic of China for Application No. 2008800243237, filed May 19, 2008 (Applicant—UAB Research Foundation; Inventor—Guthrie, et al.;) (p. 1-8).

Third Office Action issued Dec. 28, 2012 by the State Intellectual Property Office of the People's Republic of China for Application No. 2008800243237, filed May 19, 2008 (Applicant—UAB Research Foundation; Inventor—Guthrie, et al.;) (p. 1-5).

Amendments filed Apr. 4, 2012 to the European Patent Office for Application No. 20080826034, filed May 19, 2008 (Applicant—UAB Research Foundation; Inventor—Guthrie, et al.;) (p. 1-10).

Communication from the Examining Division issued Jun. 8, 2012 by the European Patent Office for Application No. 20080826034, filed May 19, 2008 (Applicant—UAB Reserach Foundation; Inventor—Guthrie, et al.;) (p. 1-8).

Communication Regarding Possible Amendments of Claims issued Jan. 13, 2010 by the European Patent Office for Application No. 20080826034, filed May 19, 2008 (Applicant—UAB Research Foundation; Inventor—Guthrie, et al.;) (p. 1-2).

European Search Report issued on Sep. 15, 2011 by the European Patent Office for Application No. 2008826034, filed May 19, 2008 (Applicant—UAB Research Foundations; Inventor—Barton Guthrie;) (p. 1-9).

Invitation Pursuant to Rule 62a(1) issued May 16, 2011 by the European Patent Office for Application No. 20080826034, filed May 19, 2008 (Applicant—UAB Research Foundation; Inventor—Guthrie, et al,;) (p. 1-2).

Response and Amendment filed Feb. 23, 2010 to the European Patent Office for Application No. 20080826034, filed May 19, 2008 (Applicant—UAB Research Foundation; Inventor—Guthrie, et al.;) (p. 1-10).

Response and Amendment filed Oct. 17, 2012 by the European Patent Office for Application No. 08826034.4, filed May 19, 2008 (Applicant—UAB Research Foundation; Inventor—Guthrie, et al.;) (p. 1-16).

Appeal Brief filed Mar. 25, 2013 for Application No. 2010-508631, filed May 19, 2008 (Applicant—UAB Research Foundation; Inventor—Guthrie, et al.;) (p. 1-8).

Final Office Action issued Oct. 12, 2012 for Application No. 2010-508631, filed May 19, 2008 (Applicant—UAB Research Foundation; Inventor—Guthrie, et al.;) (p. 1-2).

Notice of Appeal and Amendment filed Feb. 12, 2013 for Application No. 2010-508631, filed May 19, 2008 (Applicant—UAB Research Foundation; Inventor—Guthrie, et al.;) (p. 1-8).

Official Action issued Feb. 10, 2012 by the Japanese Patent Office for Application No. 2010-508631, filed May 19, 2008 (Applicant—UAB Research Foundation; Inventor—Guthrie, et al.;) (p. 1-4).

Official Action on Formalities issued Feb. 21, 2013 by the Japanese Patent Office for Application No. 2010-508631, filed May 19, 2008 (Applicant—UAB Research Foundation; Inventor—Guthrie, et al.;) (p. 1-1).

Response to Official Action filed Aug. 10, 2012 for Application No. 2010-508631, filed May 19, 2008 (Applicant—UAB Research Foundation; Inventor—Guthrie, et al.;) (p. 1-5).

Voluntary Amendment filed Jan. 15, 2010 to Japan Patent Office for Application No. 2010/508631, filed May 19, 2008 (Applicant—UAB Research Foundation; Inventor—Guthrie, et al.;) (p. 1-14).

Examination Report issued May 3, 2011 by the New Zealand Intellectual Property Office for Application No. 582133, filed May 19, 2008 (Applicant—UAB Research Foundation; Inventor—Guthrie, et al.;) (p. 1-2).

Examination Report and Notice of Acceptance issued Dec. 3, 2012 by the New Zealand Intellectual Property Office for Application No. 582133, filed May 19, 2008 (Applicant—UAB Research Foundation; Inventor—Guthrie, et al.;) (p. 1-1).

Response to Examination Report filed Nov. 19, 2012 for Application No. 582133, filed May 19, 2008 (Applicant—UAB Research Foundation; Inventor—Guthrie, et al.;) (p. 1-8).

International Search Report and Written Opinion issued on Oct. 16, 2012 by the International Searching Authority for Application No. PCT/US12/50238, filed Aug. 10, 2012 (Applicant—VIPAAR, LLC; Inventor—Marcus W. Dillavou;) (p. 1-7).

* cited by examiner

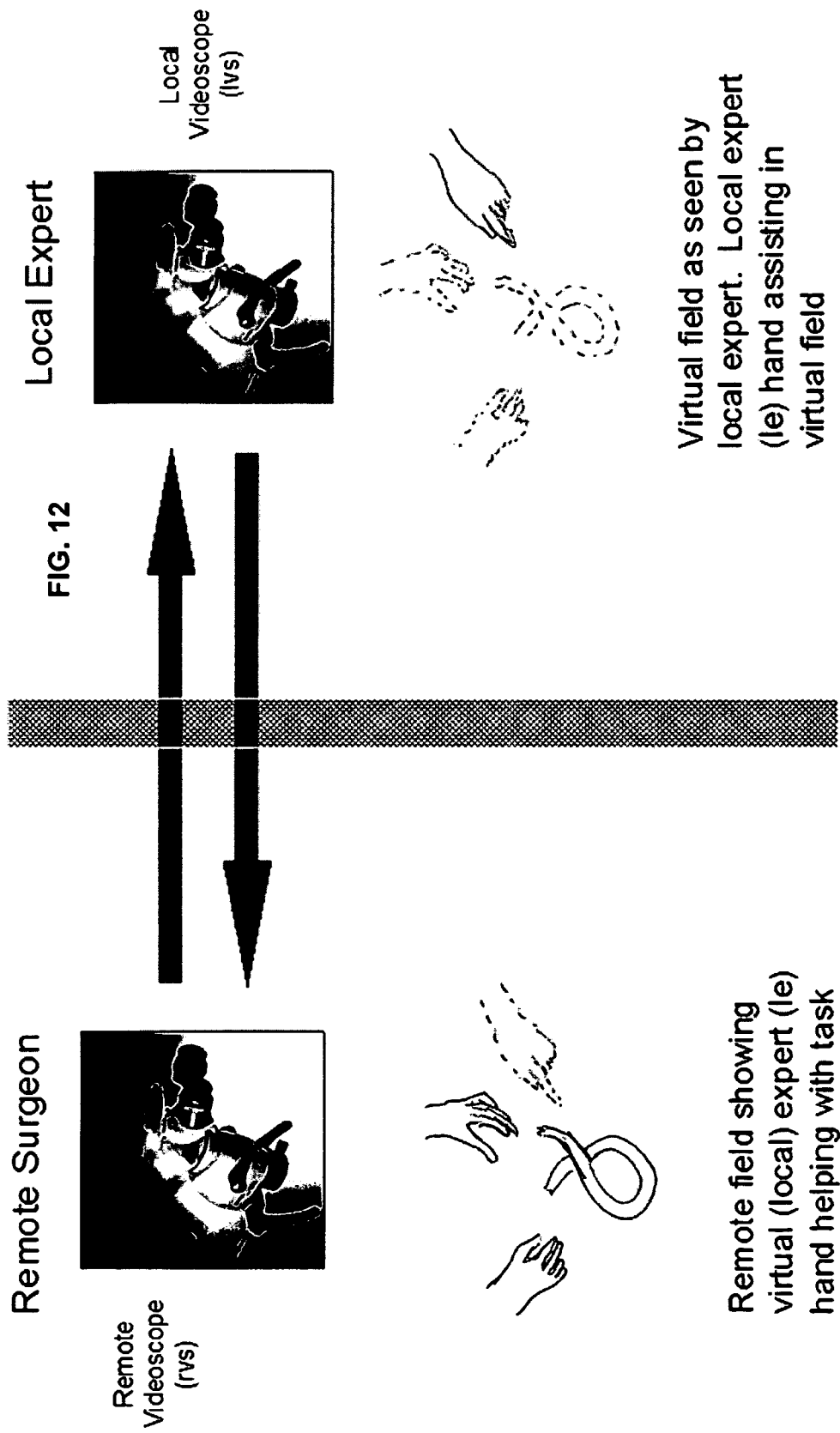

FIG. 13

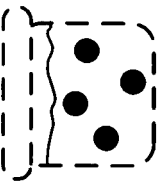

Slices of MRI scan of beaker of object.

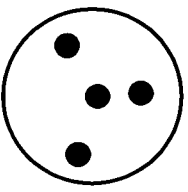

User interface within the videoscope enables user to scale/rotate virtual beaker so that it is superimposed onto real beaker.

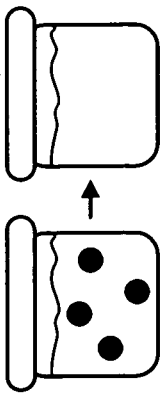

Objects suspended in beaker of opaque gelatin. Objects are not visible to the eye.

Computer volume rendering of "virtual beaker."

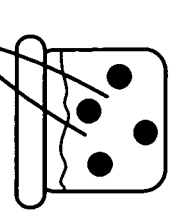

Once merged, the user can use the virtual beaker to navigate within the real beaker.

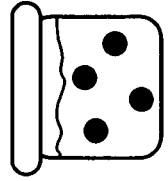

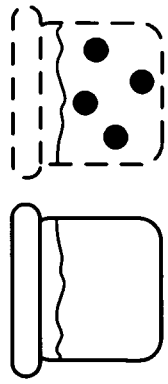

Real and virtual beaker as viewed through a videoscope.

VIRTUAL INTERACTIVE PRESENCE SYSTEMS AND METHODS

CROSS REFERENCE TO RELATED PATENT APPLICATION

This application claims priority to U.S. Provisional Application No. 60/930,874 filed May 18, 2007, herein incorporated by reference in its entirety.

FEDERAL GOVERNMENT SUPPORT CLAUSE

The present invention was developed with Government funds provided by the Department of Energy under Grant/Contract numbers H30912, H34612, and H35662. The Government has certain rights in this invention.

SUMMARY

Disclosed are methods and systems for establishing a virtual interactive presence (VIP) using a display system (VIP display), for example a stereoscopic display system. The disclosed methods and systems can utilize virtual reality.

Additional advantages will be set forth in part in the description which follows or may be learned by practice. The advantages will be realized and attained by means of the elements and combinations particularly pointed out in the appended inventive concepts. It is to be understood that both the foregoing general description and the following detailed description are exemplary and explanatory only and are not to be considered restrictive.

BRIEF DESCRIPTION OF THE DRAWINGS

The accompanying drawings, which are incorporated in and constitute a part of this specification, illustrate embodiments and together with the description, serve to explain the principles of the methods and systems provided:

FIG. 12 illustrates virtual presence in a remote surgical environment;
FIG. 13 illustrates merging of medical imaging with an operative field.

DETAILED DESCRIPTION

Figure 1:
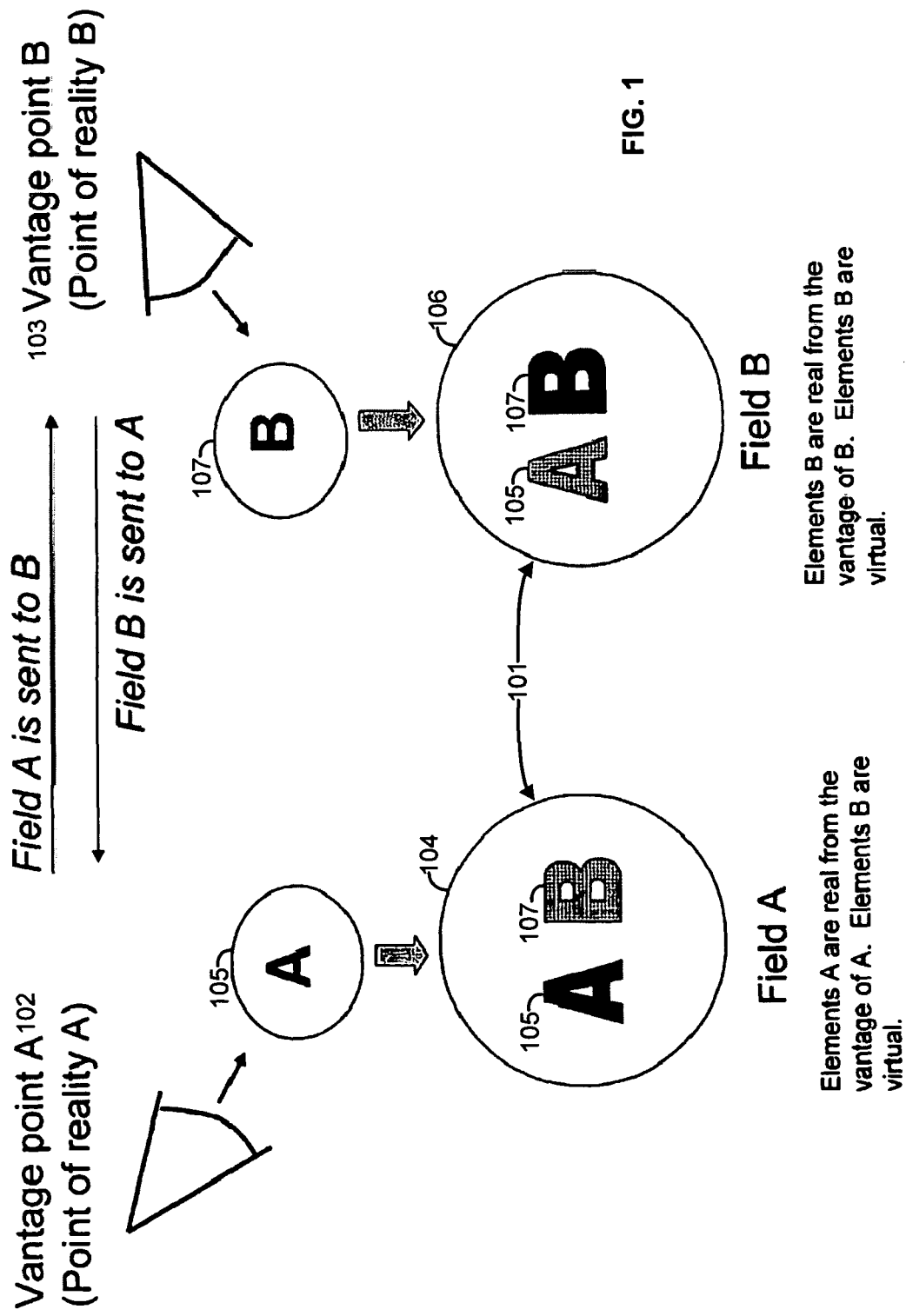
FIG. 1 illustrates virtual interactive presence.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended inventive concepts, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Disclosed are methods and systems for establishing a virtual interactive presence (VIP) using a display system (VIP display), for example a stereoscopic display system. The disclosed methods and systems can utilize virtual reality. Virtual reality (VR) refers to a computer-based application which provides a human-computer interface such that the computer and its devices create a sensory environment which is dynamically controlled by the actions of the individual, so that the environment appears "real" to the user. With VR, there is communication between a computer system and a user. The computer creates a sensory environment for the user to experience which may be, in one aspect, multisensory (although this is not essential) and the computer creates a sense of reality in response to user inputs.

In one exemplary aspect, the system disclosed can utilize at least two types of VR, Immersive and Non-immersive. Immersive VR creates the illusion that the user is actually in a different environment. In one aspect, the system accomplishes this through the use of such devices as Head Mounted Displays (HMD's), earphones, and input devices such as gloves or wands. In another aspect, in order to enhance to realism of the experience, a plurality of Degrees of Freedom (DOF's) are utilized, which the software can simulate. Generally, the more the DOF's, the better the realism of the experience. Exemplary DOF's include, without limitation: X, Y, Z, roll, pitch, and yaw.

Non-immersive VR creates an environment that is differentiable from the user's surrounding environment. It does not give the illusion that the user is transported to another world. Non-immersive VR works by creating a 3-dimensional image and surround sound through the use of stereo projection systems, computer monitors, and/or stereo speakers. Non-immersive VR can be run from a personal computer without added hardware.

In one aspect, movement in Immersive VR can be realized by a system through the use of optical, acoustical, magnetic, or mechanical hardware called trackers. Preferably, the input devices have as many of these trackers as possible, so that movement can be more accurately represented. For instance, virtual gloves can have up to 3 trackers for each index, and more for the palm and wrist, so that the user can grab and press objects. In one aspect, the trackers can be equipped with positioning sensors, that tell a computer which direction the input is facing and how the input device is tilted in all directions. This gives a sensor with six degrees of freedom.

Output devices bring the user to the virtual world. An example of an output device that can be used in the present system include, without limitation, head mounted displays (HMD) in the form of glasses or goggles, which allow a user to wear a display system on their head. One approach to the HMD is to use a single Liquid Crystal Display (LCD), wide enough to cover both eyes. Another approach is to have two separated displays—one for each eye. This takes somewhat more computer power, since the images displayed are different. Each display has a separate image rendered from the correct angle in the environment. Eye-tracking can be combined with HMDs. This can allow, for example, surgeons to move their eyes to the part of an image they want to enhance.

Another example of an output device that can be used in an embodiment of the present system is shuttered glasses. This device updates an image to each eye every other frame, with the shutter closed on the other eye. Shuttered glasses require a very high frame rate in order to keep the images from flickering. This device is used for stereo monitors, and gives an accurate 3-d representation of a 2-d object, but does not immerse the user in the virtual world.

Another output device that can be used in an embodiment of the present system is a screen with multiple projectors. The screen can be either a plane or bent. A challenge when using multiple projectors on the same screen is that there can be visible edges between the projections. This can be remedied be using a soft-edge system wherein the projection goes more and more transparent at the edges and the projections overlap. This produces an almost perfect transition between the images. In order to achieve a desired 3D effect, shuttered glasses can be used. Special glasses can be used, that alternate between making the glass either completely opaque or completely transparent. When the left eye is opaque, the right one is transparent. This is synchronized to the projectors that are projecting corresponding images on the screen.

In another aspect, a Cave Automatic Virtual Environment (CAVE) can also be used in the present system. A CAVE can use mirrors in a cube-shaped room to project stereo images onto the walls, giving the illusion that you are standing in a virtual world. The world is constantly updated using trackers, and the user is allowed to move around almost completely uninhibited.

Disclosed are methods and systems for establishing a virtual interactive presence. Such methods and systems can render a number of elements/participants virtually present into a field of interest in a manner such that the users can interact for any given purpose, such as the delivery of remote expertise. A field of interest can comprise varying amounts of "real" and "virtual" elements, depending on a point of view. Various components of the disclosed methods and systems are illustrated in FIG. 1.

A common field of interest 101 is a field within which elements are either physically or virtually present. Point of Reality (or Point of View) refers to the vantage of the element/participant that is experiencing the common field of interest. In FIG. 1, exemplary points of reality, or points of view, are shown at 102 and 103. These represent VIP displays. The common field of interest would appear similar from both vantages, or points of view, but each comprises differing combinations of local (physical) and remote (virtual) elements/participants.

Local elements are elements and/or participants which are physically present in the common field of interest. In FIG. 1, element A 105 is a local element for field A 104 and is physically present in field A 104. Element B 107 is a local element for field B 106 and is physically present in field B 106.

Remote elements are elements and/or participants that are not physically present in the common field of interest. They are experienced as "virtually present" from any other local vantage point. As shown in FIG. 1, element B 107 is a remote element to field A 104 and is virtually present in field A 104. Element A 105 is a remote element in field B 106 and is virtually present in field B 106.

Figure 2:
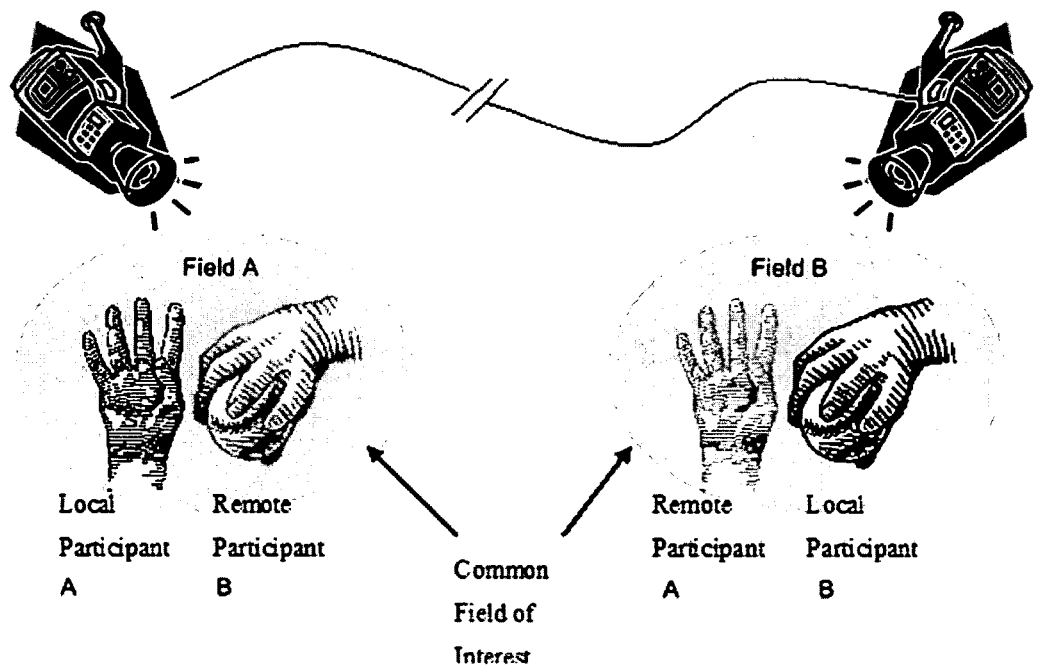
FIG. 2 illustrates virtual interactive presence.

Methods for rendering a virtual interactive presence by combining local and remote elements and/or participants can comprise one or more of the following steps. A common local field can be rendered in a manner that reflects the physical presence of the field, elements and/or participants. As shown in FIG. 2, Participant A can experience real elements in field A through a viewer. The common local field can be rendered such that it is experienced remotely in a manner that enables remote participants to experience it similarly to the local persons. As shown in FIG. 2, this is illustrated by Participant A experiencing element B as virtually present in field A.

Remote persons can insert themselves and/or interact with the virtual field as rendered to them. For example, Participant A can insert hands, instruments, etc. into field A and interact with the virtual element(s) B. Viewer B can view a 'virtual compliment' to this, with Viewer B's real elements interacting with Participant A's virtual elements.

The common local field can be continuously updated such that the presence of the remote participants can be rendered in real time. For example, the remote scene can be the most up-to-date available with the time lag between the remote capture and the local render kept as low as possible. Conversely, if there is a need to introduce a timing difference, this can be accomplished as well.

The common local field can be scaled to a size and depth to meaningfully match the local scene. And the common local field can be configurable, such that remote elements can be made more or less transparent, removed entirely, or otherwise altered to suit the needs of the local user.

Figure 3:
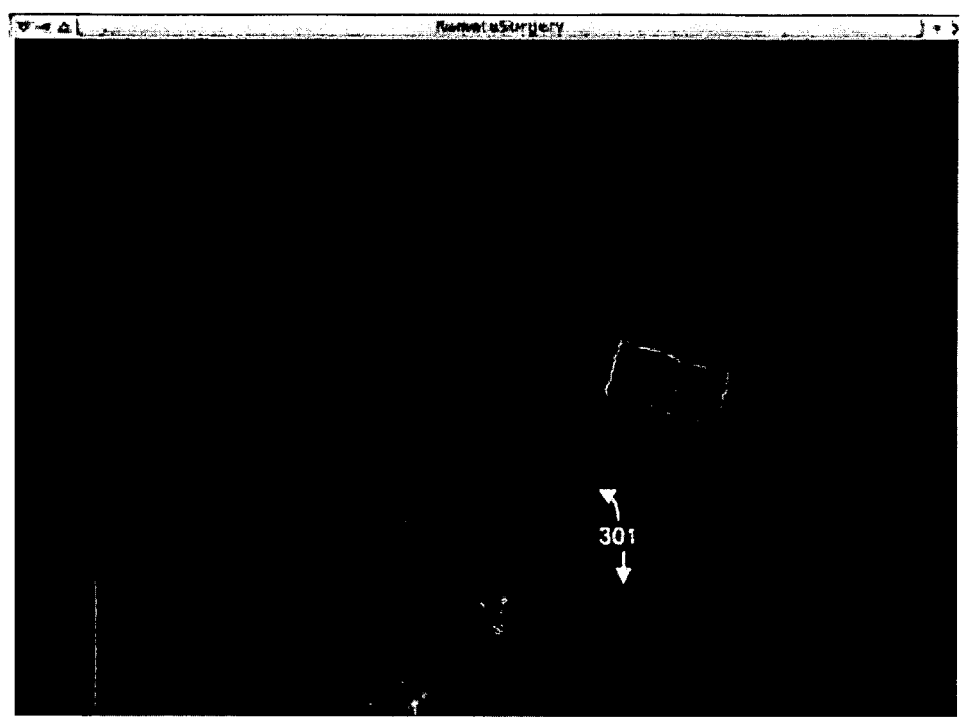
FIG. 3 illustrates a local expert assisting a remote user.

The local participants can experience the virtually present participants in a manner that enables continuous interaction in the common local field. FIG. 3 illustrates a local expert assisting a remote user. The hands of the local expert 301 are slightly transparent and superimposed into the field that is viewed by the remote user. The remote user can view the local expert's hands, the remote user's hands and a puzzle located at the remote user's location. The local expert is assisting the remote user in assembling a puzzle.

Figure 4:
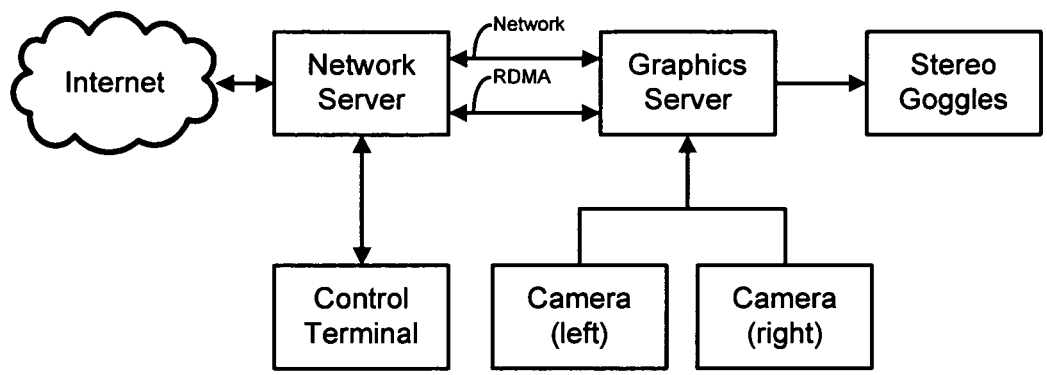
FIG. 4 illustrates an exemplary virtual presence system.

FIG. 4 illustrates an exemplary virtual presence system. One such system can be used by each remote participant that is to join the same session. Each system can communicate with each other through a network connection. For example, remote sites can connect via the internet. Tasks can be divided amongst a plurality of computers in each system. For example, one computer (a graphics server) can gather images from local cameras and a network server, perform the stereo image composition tasks, and drive a local stereoscopic display system.

Figure 5:
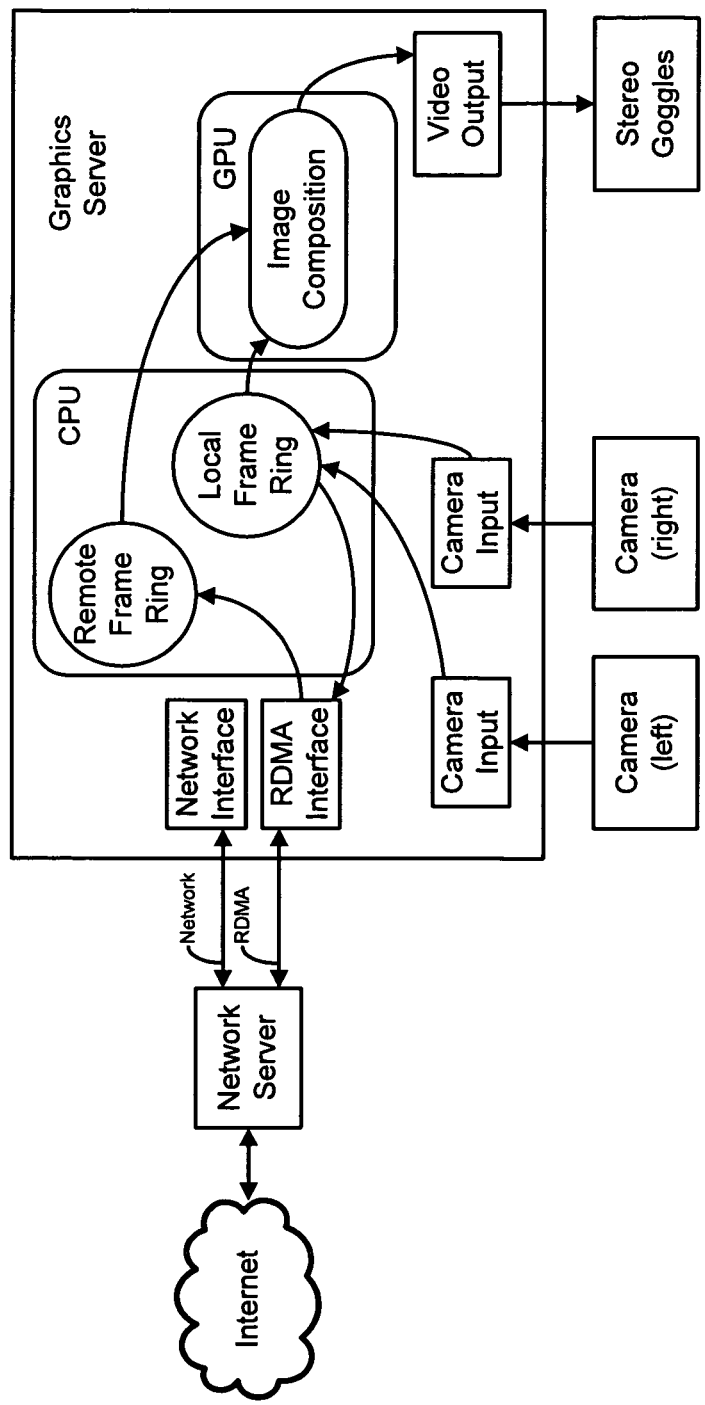
FIG. 5 illustrates exemplary processes performed within a graphics server.

FIG. 5 illustrates exemplary processes that can be performed with the graphics server. Images can be gathered into local data structures (frame rings). Local images can be gathered from a plurality of cameras, for example two cameras. Remote images can be provided by the network server via a high-speed remote direct memory access (RDMA) connection, for example. These images can be combined so that the remote user and the local user can be seen in the same scene (as in FIG. 3). This composite result can be transmitted to a local stereoscopic display system. A second computer can act as the network server, which can perform network encoding/decoding tasks as well as depth map generation, for example.

Figure 6:
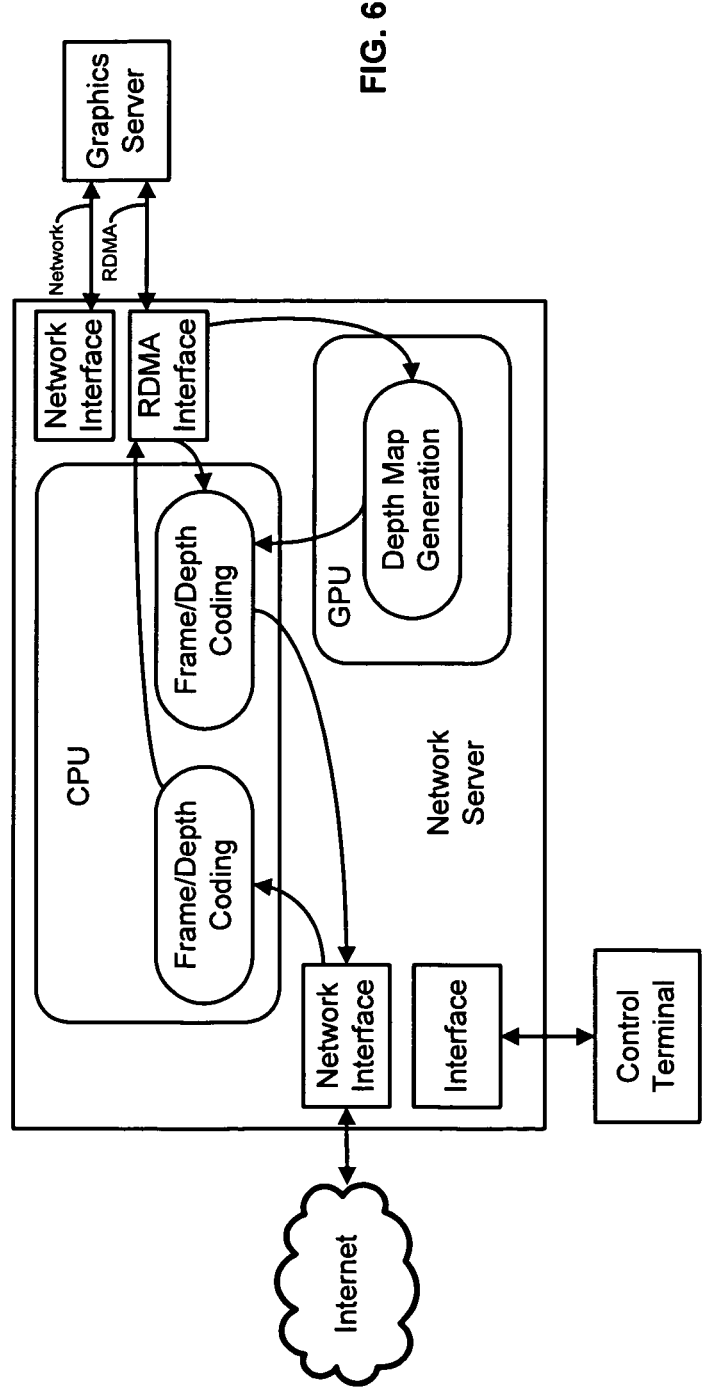
FIG. 6 illustrates exemplary processes performed within a network server.

FIG. 6 illustrates exemplary processes that can be performed with the network server. Local images gathered from the graphics server via the RDMA connection can be analyzed and mapped with depth information, encoded for efficient network transmission, and sent to an external network connection to be received by a corresponding network server at the remote site. Simultaneously, encoded images and depth maps can be received from the remote site, decoded, and provided to the local graphics server via the RDMA connection.

The system can be user-controlled by a control terminal connected to the network server; the user can then access and control the graphics server via the dedicated network connection to the network server.

Parameters of virtual interactive presence can be configured depending on the system used. Configurable parameters include, but are not limited to, size of virtual elements, presence of virtual elements (opaque, translucent, etc.), time of virtual presence (time can be configured to be delayed, slowed, increased, etc.), superimposition of elements such that any combination of virtual and real can be superimposed and/or 'fitted' over one another, and the like.

Figure 7:
FIG. 7 illustrates a side view of an exemplary VIP display.
Figure 8:
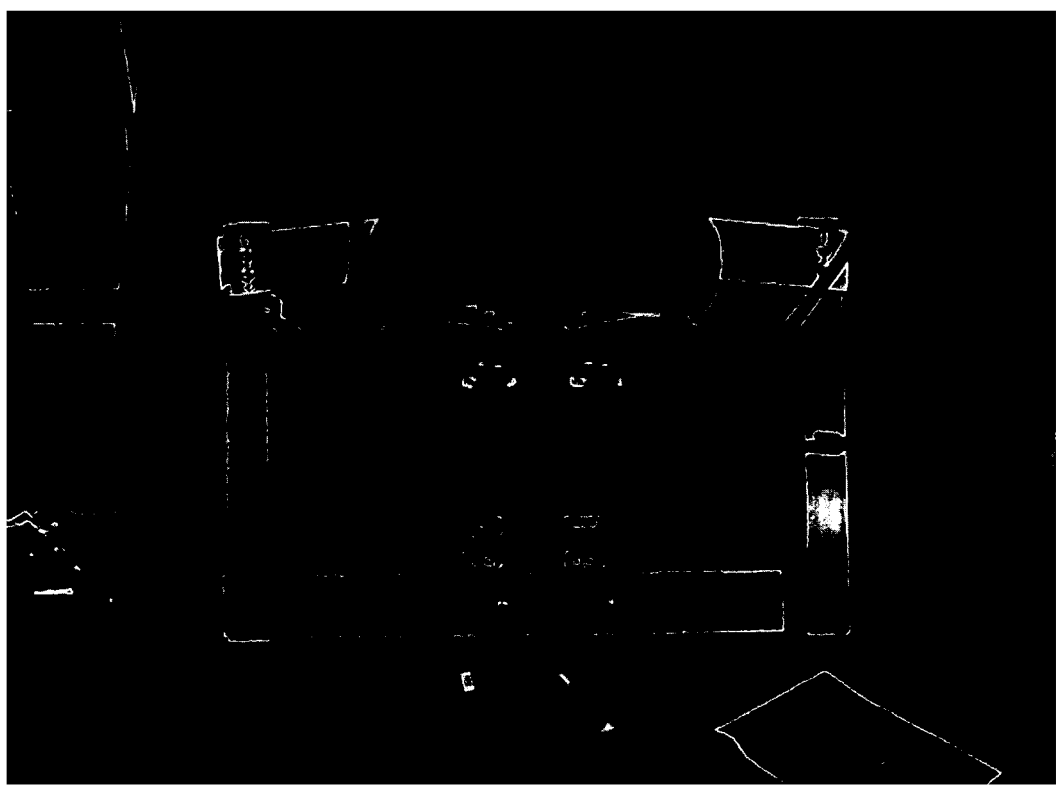
FIG. 8 illustrates a user's view of an exemplary VIP display.
Figure 9:
FIG. 9 illustrates a user's view of an exemplary VIP display.

FIG. 7 illustrates a side view of an exemplary VIP display.
FIG. 8 illustrates a user's view of an exemplary VIP display.
FIG. 9 illustrates a user's view of an exemplary VIP display.

As used herein, a "local" field of interest can refer to a local physical field and local user, thus making every other field remote. Each field can be local to its local physical user, but remote to other users. The composite of the fields can be a common field of interest. This is distinct from common "virtual worlds" in that there can be components of "real" within the local rendering of the common field of interest and interactions can be between actual video (and other) renderings of physical objects and not just graphic avatars representing users and objects. The methods and systems provided allow for virtual interactive presence to modify/optimize a physical domain by the interplay of real and virtual.

Figure 10:
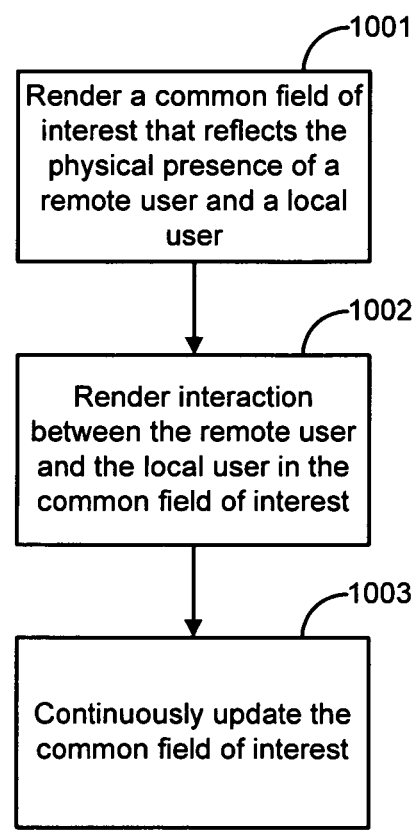
FIG. 10 illustrates an exemplary method.

In an aspect, illustrated in FIG. 10, provided are methods for virtual interactive presence comprising rendering a common field of interest that reflects the physical presence of a remote user and a local user at 1001, rendering interaction between the remote user and the local user in the common field of interest at 1002, and continuously updating the common field of interest such that the presence of the remote user is rendered in real time to the local user and the presence of the local user is rendered in real time to the remote user at 1003.

The common field of interest can be rendered such that the remote user experiences the common field of interest similarly to the local user. The local user can experience the remote user's physical presence in a manner that enables continuous interaction in the common field of interest with the remote user. The methods can further comprise rendering the physical presence of a local object in the common field and rendering interaction between the local user and the local object in the common field. The methods can further comprise rendering the physical presence of a local object in the common field of interest and rendering interaction between the remote user and the local object in the common field of interest.

Figure 11:
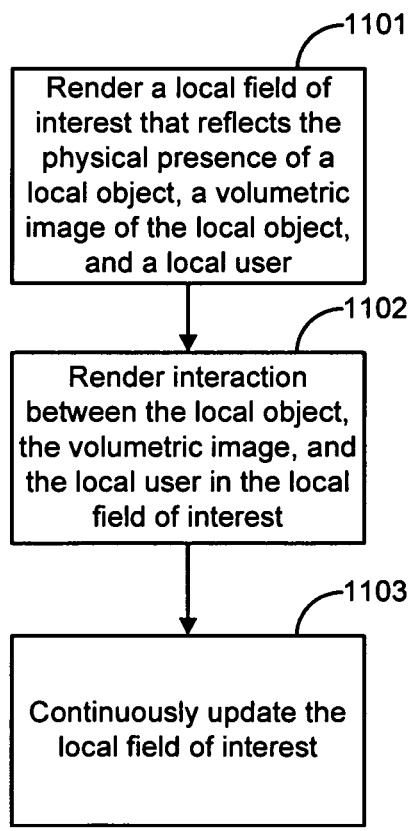
FIG. 11 illustrates another exemplary method.

In another aspect, illustrated in FIG. 11, provided are methods for virtual interactive presence comprising rendering a local field of interest that reflects the physical presence of a local object, a volumetric image of the local object, and a local user at 1101, rendering interaction between the local object, the volumetric image, and the local user in the local field of interest at 1102, and continuously updating the local field of interest such that the presence of the local object and the volumetric image of the local object is rendered in real time to the local user at 1103.

The local object can be, for example, a patient and the volumetric image of the local object can be, for example, a medical image of a part of the patient. However, the local object can be any object of interest and the image of the local object can be any accurate rendering of that object. For example, could be an automobile engine and a 3D graphic of the engine, etc.

The medical image can be, for example, one of, an x-ray image, an MRI image, or a CT image. The methods can further comprise superimposing, by the local user, the volumetric image onto the local object. The superimposition can be performed automatically by a computer.

The methods can further comprise adjusting, by the local user, a property of the volumetric image. The property can be one or more of transparency, spatial location, and scale.

The methods can further comprise rendering a local tool in the local field of interest. The methods can further comprise rendering the local tool in accurate spatial relation to the rendering of the local object. The tool can be any type of tool, for example, a surgical tool.

In another aspect, provided are systems for virtual presence, comprising a virtual presence display, configured for displaying a common field of interest, a local sensor, configured for obtaining local virtual presence data, a network interface, configured for transmitting local virtual presence data and receiving remote virtual presence data, and a processor, coupled to the virtual presence display, the local sensor, and the network interface, wherein the processor is configured to perform steps comprising, rendering a common field of interest that reflects the physical presence of a remote user and a local user based on the local virtual presence data and the remote virtual presence data, rendering interaction between the remote user and the local user in the common field of interest, continuously updating the common field of interest such that the presence of the remote user is rendered in real time to the local user and the presence of the local user is rendered in real time to the remote user, and outputting the common field of interest to the virtual presence display.

The virtual presence display can be one or more of a stereoscopic display, a monoscopic display (such as a CRT, LCD, etc.), and the like. The sensor can be one or more of a camera, an infrared sensor, a depth scan sensor, and the like. The common field of interest can be rendered such that the remote user experiences the common field of interest similarly to the local user. The local user can experience the remote user's physical presence in a manner that enables continuous interaction in the common field of interest with the remote user.

The processor can be further configured to perform steps comprising rendering the physical presence of a local object in the common field of interest and rendering interaction between the local user and the local object in the common field of interest.

The processor can be further configured to perform steps comprising rendering the physical presence of a local object in the common field of interest and rendering interaction between the remote user and the local object in the common field of interest.

Further provided are systems for virtual presence, comprising a virtual presence display, configured for displaying a local field of interest, a local sensor, configured for obtaining local virtual presence data, a processor, coupled to the virtual presence display and the local sensor, wherein the processor is configured to perform steps comprising, rendering a local field of interest that reflects the physical presence of a local object and a local user based on the local virtual presence data and a volumetric image of the local object, rendering interaction between the local object, the volumetric image, and the local user in the local field of interest, continuously updating the local field of interest such that the presence of the local object and the volumetric image of the local object is rendered in real time to the local user, and outputting the local field of interest to the virtual presence display.

The virtual presence display can be one or more of a stereoscopic display, a monoscopic display (such as a CRT, LCD, etc.), and the like. The sensor can be one or more of a camera, an infrared sensor, a depth scan sensor, and the like.

The local object can be, for example, a patient and the volumetric image of the local object can be, for example, a medical image of a part of the patient. The medical image can be, for example, one of, an x-ray image, an MRI image, or a CT image. However, the local object can be any object of interest and the image of the local object can be any accurate rendering of that object. For example, could be an automobile engine and a 3D graphic of the engine, etc.

The processor can be further configured to perform steps comprising superimposing, by the local user, the volumetric image onto the local object. The processor can be further configured to perform steps comprising adjusting, by the local user, a property of the volumetric image. The property can be one or more of transparency, spatial location, and scale.

The processor can be further configured to perform steps comprising rendering a local tool in the local field of interest. The processor can be further configured to perform steps comprising rendering the local tool in accurate spatial relation to the rendered local object.

The disclosed methods and systems can have broad applications. For example, surgery, gaming, mechanics, munitions, battle field presence, instructional efforts (training) and/or any other situation where interaction is part of the scenario.

Also disclosed are methods and systems that enable a remote expert to be virtually present within a local surgical field. Virtual interactive presence can be used to enable two surgeons remote from each other to interactively perform a surgical procedure. The methods and system enable two or more operators to be virtually present, and interactive, within the same real operative field, thus supporting remote assistance and exporting surgical expertise.

The methods and systems can also be used to superimpose imaging data of the operative anatomy onto the anatomy itself for guidance and orientation (augmented reality). The methods and systems can be used for training of students. The methods and systems augment and enhance the field of robotics by virtually bringing an expert into the robotic field to guide the robot operator. The methods and systems are applicable to endoscopic procedures by inserting the expert's hands directly into the endoscopic field for guidance. The methods and systems expand remote surgery by providing the assistance of a remote expert to an actual local surgeon, whose basic skills can handle emergencies, and who will learn from the virtual interaction. The methods and systems can be used at trauma sites and other medical environments. The methods and systems can be used to provide remote assistance in other areas such as engineering, construction, architecture, and the like. The methods and systems disclosed can be used to transmit expertise to a remote 'site of need', merge contemporary imaging directly into the surgical field, and train surgical students An exemplary remote surgical assistance system for transmitting surgical maneuvers of a local expert to a remote surgeon for the purpose of guiding/assisting the remote surgeon is illustrated in FIG. 12. The remote surgical field can be viewed by the remote surgeon with a binocular video system. The video system can show the field with his hands and instruments performing the procedure. The viewing system can be referred to as a surgical videoscope.

The binocular video rendering of the remote field can be transmitted to the local expert), who can view the (now virtual) stereoscopic rendering of the procedure through a second surgical videoscope system. The local expert can insert his hands into the virtual field, thus seeing his real hands within the virtual field.

The video image of the local expert's hands can be transmitted back to the remote surgeon's surgical videoscope system superimposed into the real field. The remote surgeon can then see the expert's virtual hands within his surgical field in a spatially/anatomically relevant context. With this system, the local expert can use his hands to show the remote surgeon how to perform the case.

Exemplary elements of the system can comprise a remote station where the remote surgeon can perform the operative procedure, a remote surgical videoscope system comprised of, for example, a fixed stereoscopic videoscope that may resemble a mounted microscope. This apparatus can be used by the remote surgeon to view the operative field. Any other type of suitable VIP display can be used. The system can project the binocular video image to a similar local surgical videoscope at a local station. The local surgical videoscope can receive the binocular video image of the remote procedure and allow the local expert to view it. The local videoscope can view the local surgeons hands as they move within the virtual remote field as viewed through the local videoscope. The local videoscope can then transmit the local expert's hands back to the remote videoscope so that the remote surgeon can see the expert's virtual hands within the real field.

With this system, the local expert can show the remote surgeon the appropriate maneuvers that result in successful completion of the case. The remote surgeon can have a basic skill set to carry out the new procedure. Therefore, the local expert can simply demonstrates to the remote surgeon new ways to apply the skill set. This system does not have to supplant the remote surgeon, but can be used to enhance his/her capability. The remote surgeon can be on hand to rapidly deal with any emergencies. Time delay is minimized because the remote surgeon can use his/her own hands to perform the task, eliminating the need for the local expert to manipulate remote robotic apparatuses.

Also disclosed are methods and systems for merging contemporary medical imaging onto an operative field. A volume image can be obtained of the operative field. For example, a volume MRI of the head, prior to the surgical procedure. The image data can be reconstructed into a three dimensional rendering of the anatomy. This rendering can be transmitted to the surgical videoscope that will be used to view the operative field. Through the videoscope, the surgeon can view this 3D rendering in a translucent manner superimposed onto the surgical field. In this case, the surgeon would see a rendered head superimposed on the real head. Using software tools in the surgical videoscope interface, the surgeon can rotate and scale the rendered image until it "fits" the real head. The videoscope system can allow the surgeon to differentially fade the rendered head and real head so that the surgeon can "look into" the real head and plan the surgery.

Exemplary elements of the system can comprise a surgical videoscope viewing system through which the surgeon views the surgical field. A computer for reconstruction of a volume-acquired MRI/CT (or other) image with sufficient resolution to enable matching it to the real surgical anatomy. The volume rendered image can be displayed through the videoscope system so that the surgeon can see it stereoscopically. A software interface can enable the surgeon to vary the translucency of the rendered and real anatomy so that the rendered anatomy can be superimposed onto the real anatomy. The surgeon can "open up" the rendered anatomy to view any/all internal details of the image as they relate to the real anatomy. Surgical tools can be spatially registered to the rendered anatomy so that behavior can be tracked and applied to the image.

As shown in FIG. 13, an example of such a task is placing small objects inside a jar of dark gelatin so that they are not visible to the surgeon. The task is for the surgeon to use a long forceps to reach into the gelatin and touch or grasp the objects. The Surgical Videoscope system can obtain a volume scan of the gelatin jar and render the jar in three dimensions and display a binocular rendering through the videoscope. The surgeon can view the rendering and the real jar through the scope system and fit the rendered jar onto the real jar. By differentially adjusting translucency, the surgeon can reach into the real jar with a forceps and grasp a selected object, while avoiding other designated objects.

The grasping instrument can be spatially registered onto the volumetric rendering of the surgical field, thereby allowing a graphic of the tool to be displayed on the rendering of the surgical field in appropriate anatomic orientation. This can provide enhanced guidance. This can be implemented by touching designated landmarks on the real object (jar) with a digitizer that communicates with the image rendering system, thus defining the object/probe relationship. Because the object (jar) is registered to the image of the jar by superimposition, a graphic of the probe can be displayed in relation to the image of the jar enabling virtual surgery.

There are many situations in which the present system can be used. For example, remote surgery, medical training, and tele-medicine, which can be used for third world countries or in a military situation. Surgeons remotely located from patients can assist other surgeons near the patient, can assist medics near the patient, and can perform surgical operations when coupled to a robotic surgery system. Other examples include, augmented or enhanced surgery—normal surgery using virtual environments, an example of which is endoscopic surgery. Surgical procedures can also be simulated. Surgeons located remote from each other may plan and practice a procedure before carrying out the operation on a real patient.

Other applications include the preparation of patient before surgery, medical therapy, preventative medicine, exposure therapy, reducing phobias, training people with disabilities and skill enhancement, and the like.

The viewer then views the projection through passive stereoscopic polarized glasses (similar to sunglasses) that route the left-eye image to the left eye, and the right-eye image to the right eye. This provides an illusion of stereopsis when the correctly-offset images are properly rendered by the software. The system can be replaced by other types of stereoscopic displays with no functional detriment to the system. The stereoscopic display can comprise at least two display projectors fitted with polarizing lenses, a back-projection screen material that maintains light polarization upon diffusion, special glasses that restrict each eye to see only light of a particular polarization, and the viewer. The image to be viewed can be rendered with two slightly different view transformations, reflecting the different locations of the ideal viewer's two eyes. One projector displays the image rendered for the left eye's position, and the other projector displays the image rendered for the right eye's position. The glasses restrict the light so that the left eye sees only the image rendered for it, and the right eye sees only the image rendered for it. The viewer, presented with a reasonable stereoscopic image, will perceive depth.

Figure 14:
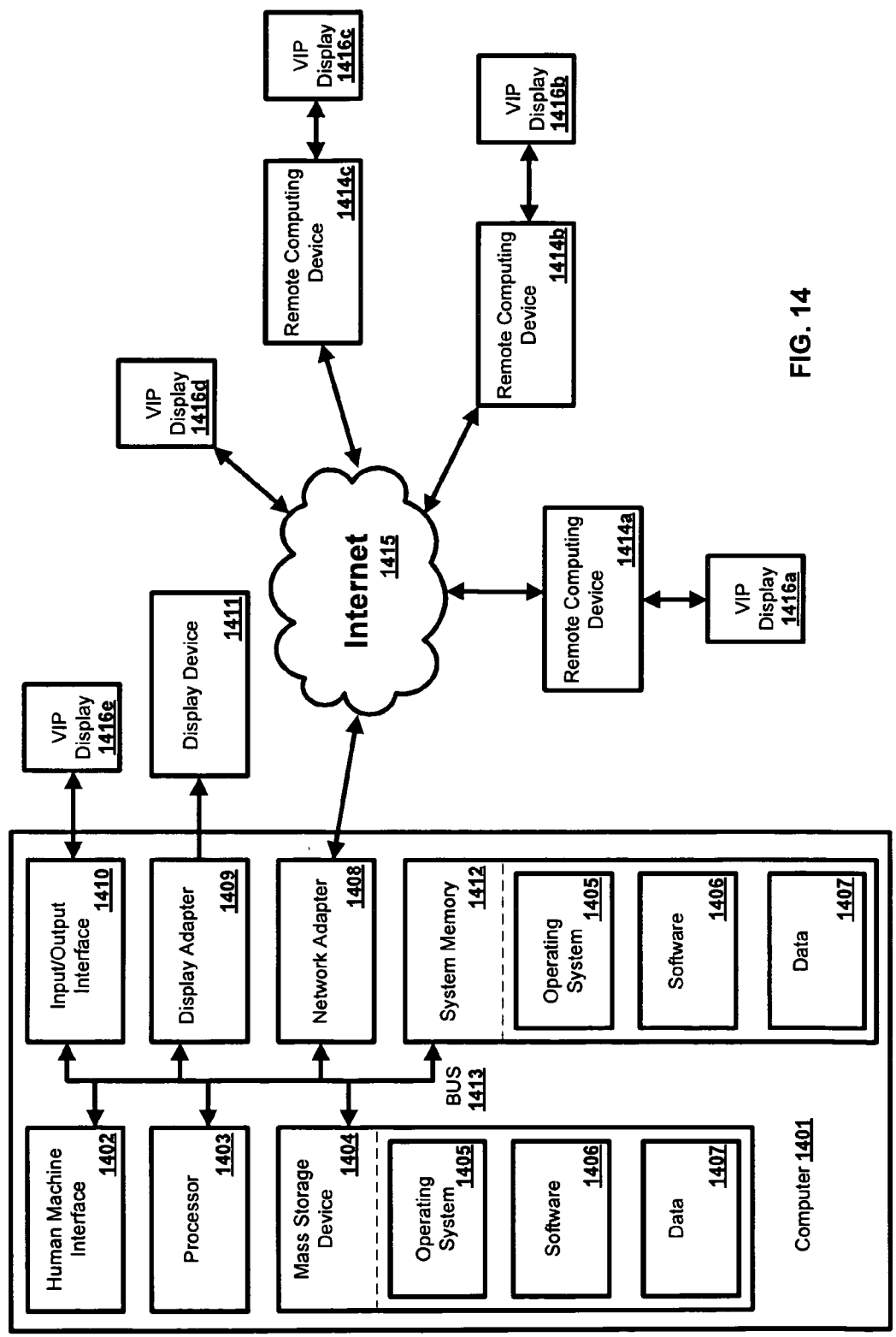
FIG. 14 illustrates an exemplary operational environment.

FIG. 14 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The methods may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The methods disclosed herein can be implemented via one or more general-purpose computing devices in the form of a computer 1401. The components of the computer 1401 can include, but are not limited to, one or more processors or processing units 1403, a system memory 1412, and a system bus 1413 that couples various system components including the processor 1403 to the system memory 1412.

The system bus 1413 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 1413, and all buses specified in this description can also be implemented over a wired or wireless network connection and each of the subsystems, including the processor 1403, a mass storage device 1404, an operating system 1405, application software 1406, data 1407, a network adapter 1408, system memory 1412, an Input/Output Interface 1410, a display adapter 1409, a display device 1411, and a human machine interface 1402, can be contained within one or more remote computing devices 1414$a,b,c$ at physically separate locations, connected through buses of this form, in effect implementing a fully distributed system.

The computer 1401 typically includes a variety of computer readable media. Such media can be any available media that is accessible by the computer 1401 and includes both volatile and non-volatile media, removable and non-removable media. The system memory 1412 includes computer readable media in the form of volatile memory, such as random access memory (RAM), and/or non-volatile memory, such as read only memory (ROM). The system memory 1412 typically contains data such as data 1407 and/or program modules such as operating system 1405 and application software 1406 that are immediately accessible to and/or are presently operated on by the processing unit 1403.

The computer 1401 may also include other removable/non-removable, volatile/non-volatile computer storage media. By way of example, FIG. 14 illustrates a mass storage device 1404 which can provide non-volatile storage of computer code, computer readable instructions, data structures, program modules, and other data for the computer 1401. For example, a mass storage device 1404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 1404, including by way of example, an operating system 1405 and application software 1406. Each of the operating system 1405 and application software 1406 (or some combination thereof) may include elements of the programming and the application software 1406. Data 1407 can also be stored on the mass storage device 1404. Data 1407 can be stored in any of one or more databases known in the art. Examples of such databases include, DB2®, Microsoft® Access, Microsoft® SQL Server, Oracle®, mySQL, Postgre SQL, and the like. The databases can be centralized or distributed across multiple systems.

A user can enter commands and information into the computer 1401 via an input device (not shown). Examples of such input devices include, but are not limited to, a keyboard, pointing device (e.g., a "mouse"), a microphone, a joystick, a serial port, a scanner, tactile input devices such as gloves, and other body coverings, and the like. These and other input devices can be connected to the processing unit 1403 via a human machine interface 1402 that is coupled to the system bus 1413, but may be connected by other interface and bus structures, such as a parallel port, game port, or a universal serial bus (USB).

A display device 1411 can also be connected to the system bus 1413 via an interface, such as a display adapter 1409. A computer 1401 can have more than one display adapter 1409 and a computer 1401 can have more than one display device 1411. For example, a display device can be a monitor, an LCD (Liquid Crystal Display), or a projector. In addition to the display device 1411, other output peripheral devices can include components such as speakers (not shown) and a printer (not shown) which can be connected to the computer 1401 via Input/Output Interface 1410.

The computer 1401 can operate in a networked environment using logical connections to one or more remote computing devices 1414$a,b,c$. By way of example, a remote computing device can be a personal computer, portable computer, a server, a router, a network computer, a peer device or other common network node, and so on. Logical connections between the computer 1401 and a remote computing device 1414$a,b,c$ can be made via a local area network (LAN) and a general wide area network (WAN). Such network connections can be through a network adapter 1408. A network adapter 1408 can be implemented in both wired and wireless environments. Such networking environments are commonplace in offices, enterprise-wide computer networks, intranets, and the Internet 1415.

One or more VIP displays 1416$a,b,c,d,e$ can communicate with the computer 1401. In one aspect, VIP display 1416$e$ can communicate with computer 1401 through the input/output interface 1410. This communication can be wired or wireless. Remote VIP displays 1416$a,b,c$ can communicate with computer 1401 by communicating first with a respective remote computing device 1414$a,b,c$ which then communicates with computer 1401 through the network adapter 1408 via a network such as the Internet 1415. Remote VIP display 1416$d$ can communicate with computer 1401 without the need for a remote computing device. Remote VIP display 1416$d$ can communicate via a network, such as the Internet 1415. The VIP displays 1416$a,b,c,d,e$ can communicate wireless or through a wired connection. The VIP displays 1416$a,b,c,d,e$ can communicate individual or collectively as part of a VIP display network.

For purposes of illustration, application programs and other executable program components such as the operating system 1405 are illustrated herein as discrete blocks, although it is recognized that such programs and components reside at various times in different storage components of the computing device 1401, and are executed by the data processor(s) of the computer. An implementation of application software 1406 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the inventive concepts or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for virtual interactive presence comprising:
   rendering a common field of interest that reflects the physical presence of a remote user and a local user;
   rendering interaction between the physical presence of the remote user and the physical presence of the local user in the common field of interest substantially as if the remote user and the local user were physically proximate and physically interacting in real time; and
   continuously updating the common field of interest such that the physical presence of the remote user is rendered in real time to the local user and the physical presence of the local user is rendered in real time to the remote user, wherein the updated common field of interest is configured to reflect merged, real-time movement of the physical presence of the remote user and the physical presence of the local user.

2. The method of claim 1, wherein the common field of interest is rendered such that the remote user experiences the common field of interest similarly to the local user.

3. The method of claim 1 or 2, wherein the local user experiences the remote user's physical presence in a manner that enables continuous interaction in the common field of interest with the remote user.

4. The method of claim 1 or 2, further comprising:
   rendering the physical presence of a local object in the common field; and
   rendering interaction between the local user and the local object in the common field.

5. The method of claim 1, further comprising:
   rendering the physical presence of a local object in the common field of interest; and
   rendering interaction between the remote user and the local object in the common field of interest.

6. A method for virtual interactive presence comprising:
   rendering a local field of interest that reflects the physical presence of a local object, a volumetric image of the local object, and a local user;
   rendering interaction between the local object, the volumetric image, and the local user in the local field of interest substantially as if the local object, the volumetric image, and the local user were physically proximate and physically interacting in real time; and
   continuously updating the local field of interest such that the presence of the local object and the volumetric image of the local object is rendered in real time to the local user.

7. The method of claim 6, wherein the local object is a patient and the volumetric image of the local object is a medical image of a part of the patient.

8. The method of claim 7, wherein the medical image is one of, an x-ray image, an MRI image, or a CT image.

9. The method of claim 6, further comprising superimposing, by the local user, the volumetric image onto the local object.

10. The method of claim 6 or 9, further comprising adjusting, by the local user, a property of the volumetric image.

11. The method of claim 10, wherein the property is one or more of transparency, spatial location, and scale.

12. The method of claim 6, further comprising rendering a local tool in the local field of interest.

13. The method of claim 12, further comprising rendering the local tool in accurate spatial relation to the rendering of the local object.

14. A system for virtual interactive presence, comprising:
    a virtual presence display, configured for displaying a common field of interest;
    a local sensor, configured for obtaining local virtual presence data;
    a network interface, configured for transmitting local virtual presence data and receiving remote virtual presence data; and
    a processor, coupled to the virtual presence display, the local sensor, and the network interface, wherein the processor is configured to perform steps comprising,
    rendering a common field of interest that reflects the physical presence of a remote user and a local user based on the local virtual presence data and the remote virtual presence data,
    rendering interaction between the physical presence of the remote user and the physical presence of the local user in the common field of interest substantially as if the remote user and the local user were physically proximate and physically interacting in real time;
    continuously updating the common field of interest such that the physical presence of the remote user is rendered in real time to the local user and the physical presence of the local user is rendered in real time to the remote user, wherein the updated common field of interest reflects the merged, real-time movement of the physical presence of the remote user and the physical presence of the local user; and
    outputting the common field of interest to the virtual presence display such that the local user and the remote user can perceive the merged, real-time movement of the physical presence of the remote user and the physical presence of the local user via the virtual presence display.

15. The system of claim 14, wherein the virtual presence display is one or more of a stereoscopic display and a monoscopic display.

16. The system of claim 14, wherein the sensor is one or more of a camera, an infrared sensor, and a depth scan sensor.

17. The system of claim 14, wherein the common field of interest is rendered such that the remote user experiences the common field of interest similarly to the local user.

18. The system of claim 14 or 17, wherein the local user experiences the remote user's physical presence in a manner that enables continuous interaction in the common field of interest with the remote user.

19. The system of claim 14 or 17, wherein the processor is further configured to perform steps comprising:
- rendering the physical presence of a local object in the common field of interest; and
- rendering interaction between the local user and the local object in the common field of interest.

20. The system of claim 14, wherein the processor is further configured to perform steps comprising:
- rendering the physical presence of a local object in the common field of interest; and
- rendering interaction between the remote user and the local object in the common field of interest.

21. A system for virtual interactive presence, comprising:
- a virtual presence display, configured for displaying a local field of interest;
- a local sensor, configured for obtaining local virtual presence data;
- a processor, coupled to the virtual presence display and the local sensor,
- wherein the processor is configured to perform steps comprising,
  - rendering a local field of interest that reflects the physical presence of a local object and a local user based on the local virtual presence data and a volumetric image of the local object,
  - rendering interaction between the local object, the volumetric image, and the local user in the local field of interest substantially as if the local object, the volumetric image, and the local user were physically proximate and physically interacting in real time;
  - continuously updating the local field of interest such that the presence of the local object and the volumetric image of the local object is rendered in real time to the local user, and
  - outputting the local field of interest to the virtual presence display.

22. The system of claim 21, wherein the virtual presence display is one or more of a stereoscopic display and a monoscopic display.

23. The system of claim 21, wherein the sensor is one or more of a camera, an infrared sensor, and a depth scan sensor.

24. The system of claim 21, wherein the local object is a patient and the volumetric image of the local object is a medical image of a part of the patient.

25. The system of claim 24, wherein the medical image is one of, an x-ray image, an MRI image, or a CT image.

26. The system of claim 21, wherein the processor is further configured to perform steps comprising superimposing, by the local user, the volumetric image onto the local object.

27. The system of claim 21, wherein the processor is further configured to perform steps comprising adjusting, by the local user, a property of the volumetric image.

28. The system of claim 27, wherein the property is one or more of transparency, spatial location, and scale.

29. The system of claim 21, wherein the processor is further configured to perform steps comprising rendering a local tool in the local field of interest.

30. The system of claim 29, wherein the processor is further configured to perform steps comprising rendering the local tool in accurate spatial relation to the rendered local object.

* * * * *

UNITED STATES PATENT AND TRADEMARK OFFICE
CERTIFICATE OF CORRECTION

PATENT NO. : 8,520,024 B2  Page 1 of 1
APPLICATION NO. : 12/600805
DATED : August 27, 2013
INVENTOR(S) : Guthrie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Fifteenth Day of September, 2015

Michelle K. Lee
*Director of the United States Patent and Trademark Office*